United States Patent [19]

Caldwell

[11] 3,963,869
[45] June 15, 1976

[54] PARITY FRAMING OF PULSE SYSTEMS

[75] Inventor: James Lewis Caldwell, Parsippany, N.J.

[73] Assignee: Bell Telephone Laboratories, Incorporated, Murray Hill, N.J.

[22] Filed: Dec. 2, 1974

[21] Appl. No.: 528,727

[52] U.S. Cl. .................. 179/15 BS; 340/146.1 AG
[51] Int. Cl.² .......................................... H04J 3/06
[58] Field of Search ............ 179/15 BS; 178/50, 53, 178/53.1 R, 69.5; 340/146.1 AG

[56] References Cited
UNITED STATES PATENTS

| | | | |
|---|---|---|---|
| 3,456,239 | 7/1969 | Glasson | 340/146.1 AG |
| 3,529,089 | 8/1968 | Davis et al. | 179/15 |
| 3,587,043 | 6/1971 | Mengani | 179/15 BS |
| 3,591,720 | 7/1971 | Othmer | 179/15 BS |
| 3,707,604 | 12/1972 | Greefkes et al. | 179/15 A |
| 3,740,478 | 6/1973 | Breant et al. | 179/15 BS |
| 3,766,316 | 10/1973 | Hoffman et al. | 178/69.5 |
| 3,804,982 | 4/1974 | Brown | 179/15 BS |

Primary Examiner—Douglas W. Olms
Attorney, Agent, or Firm—R. O. Nimtz

[57] ABSTRACT

A carrier system is described in which a number of pulse encoded signals are multiplexed on a single transmission and demultiplexed and decoded at a remote terminal for distribution to a number of receivers at that location. A similar multiplex system uses a separate return pair of transmitting signals in the opposite direction. The multiplexed signals on each transmission line are framed by means of a framing pulse in each frame having a value which insures a preselected parity for each frame. To make sure that parity discrepancies will exist for other pulse positions even under all "1s" and all "0s" conditions, a second bit position is filled with a randomly-valued bit.

13 Claims, 6 Drawing Figures

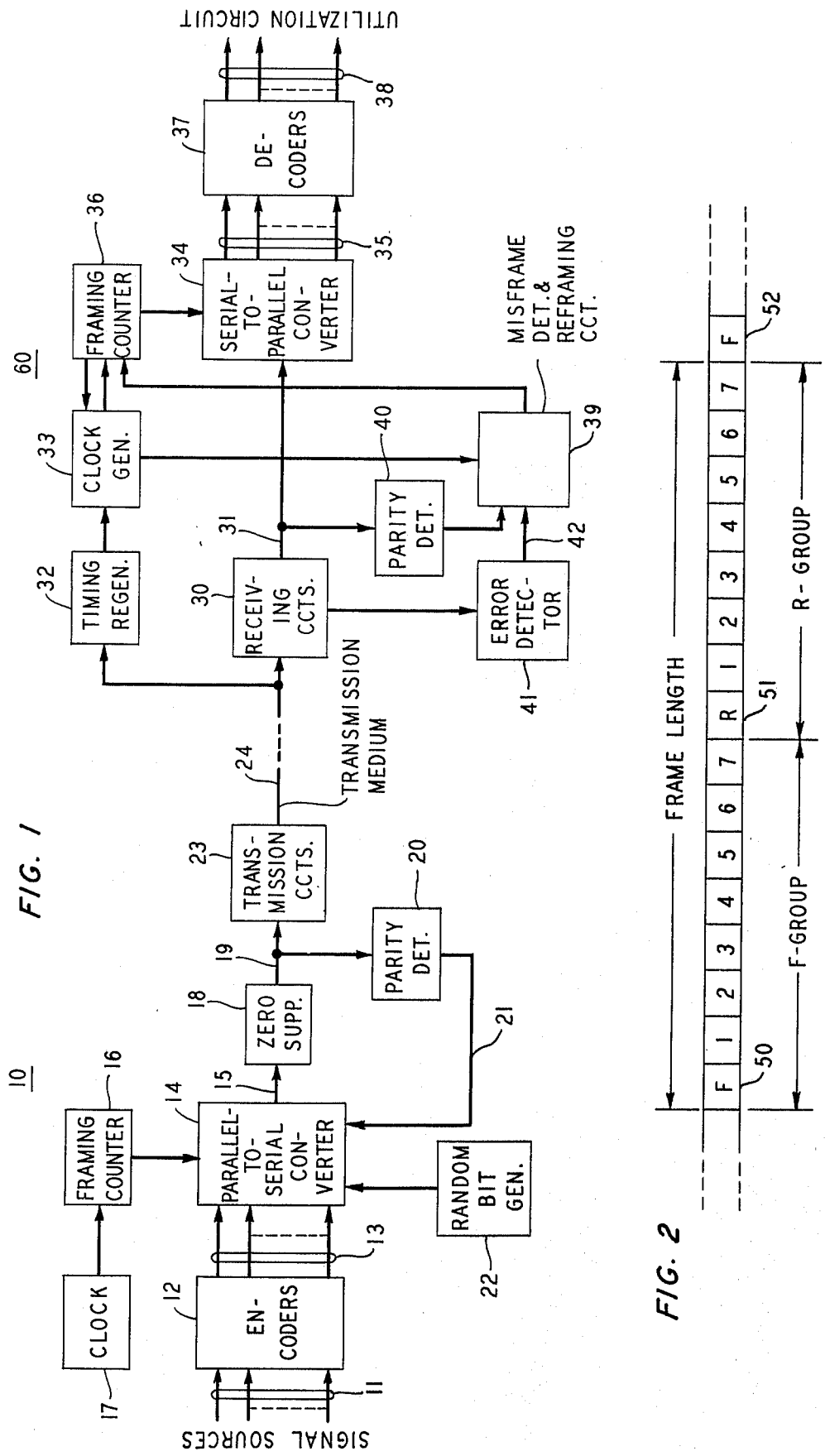

TRANSMITTER

3,963,869

PARITY FRAMING OF PULSE SYSTEMS

BACKGROUND OF THE INVENTION

1. Field of the Invention

This invention relates to multiplexed pulse transmission systems and, more particularly, to methods and apparatus for insuring proper framing of multiplexed pulse streams in such systems.

2. Description of the Prior Art

Multiplexed pulse transmission systems are common in which communication channels are concentrated on a single transmission medium by encoding and multiplexing techniques. Two such systems are found in C. G. Davis et. al. U.S. Pat. No. 3,529,089, granted Sept. 15, 1970, and J. A. Greefkes et. al. U.S. Pat. No. 3,707,604, granted Dec. 26, 1972.

In such pulse data transmission systems, it is common to time-division multiplex the pulses of several data sources in order to better utilize the common transmission facility. Upon receipt of the multiplexed data stream at its destination, the several component data streams must, in general, be individually extracted from the composite. This "demultiplexing" operation necessitates some means of determining which pulses in the multiplexed pulse train correspond to each source.

An often-employed approach requires organizing the source data and additional synchronization data into a repeating data "frame". In one typical and straight-forward example, one pulse at a time is taken from each of N binary data sources and inserted into a particular one of N+1 "time slots" assigned to its source. The extra time slot is dedicated to synchronization or "framing" data and has properties distinguishing it from data in any other time slot. If the position of the framing time slot in the received data can be determined, then the time slot of any data source can be found by measuring from the known framing time slot position, thus allowing data demultiplexing.

Special properties of the framing data are utilized to locate the position of the framing time slot by some form of search among the various time slots; this process is referred to herein as "reframing". The prior art binary framing schemes utilized a preselected pattern of bits in the framing time slot chosen to avoid matching source data sequence. Once the framing slot is located, a typical procedure would be to start a modulo (N + 1) counter counting in synchronization with the received time slots, thereby establishing a correspondence between the occurrence of the framing slot and a particular state, $s_f$, of the counter. The counter can then be used to control demultiplexing, because a known relationship exists between the states of the counter and the identities of the time slots. When the counter again reaches state $s_f$, it is assumed that (N + 1) states have been traversed, and that the corresponding time slot contains the next framing bit.

By testing the properties of the data in the succession of supposed framing time slots, using the locations thus predicted by a framing counter, it can be determined whether synchronziation is being maintained between the incoming data and the framing counter; this process is referred to as "misframe detection". The combined processes of synthesizing framing data, misframe detection, and reframing are known as "framing".

In addition to these basic requirements of all framing systems, it is also desirable to provide a framing system which permits speedy reframing, has a low susceptability to false misframe detection, is independent of the source data and involves simple and inexpensive hardware.

In some transmission system, it may not be possible to choose a simple predetermined framing data sequence which does not match source data under all conditions. Source data may vary from "random" sequences at one time, to repetitive idling or code patterns at another time, or even all 1's or all 0's data at another time, due to variations in the activity of a source or in the type of information conveyed by a source. For example, a telephone channel may require transmission of delta-modulated voice, or code patterns representing ringing or dialing, or may be idle. If framing data could be confused with any of these types of data, the possiblility of undetected misframes occurs. This may place strong restrictions on the nature of framing patterns.

If the characteristics of source data cannot be predicted at any given time, then whenever a non-framing time slot is being tested for the presence of framing data, there can be at most a probability of 0.5 that the data will fail the test criterion for each bit tested, assuming binary source and framing data. To achieve this optimum regardless of source data properties, each bit expected in the tested slot (as if it were the framing slot) must have a 0.5 probability of being a "1", independent of any other data. Thus, the data value required to pass the framing criterion, and the data value actually appearing, match with probability 0.5, under any conditions.

SUMMARY OF THE INVENTION

The present ivention comprises techniques and apparatus for framing and detecting framing of pulse signals wherein each frame includes signal pulses, a parity framing pulse and a pulse position filled by a "random" pulse generator. The framing pulse position is filled by determining the parity of the previous frame and inserting a signal which forces the overall parity to a preselected value. The "random" pulses need not be truly random, but might also be from a pseudo-random sequence.

In accordance with one embodiment of the invention, the receiving terminal continually recalculates the parity value of each frame. If the framing pulse fails to provide the required parity for two successive frames, the out-of-frame condition is assumed. If framing is lost, the reframing procedure is to search for the proper framing phase, and to require four successive successful framing matches before reverting to normal misframe detection.

The performance of the present framing scheme is enhanced considerably if misframe detection is inhibited when errors occur in the multiplexed pulse stream. This prevents erroneous misframe detection.

One major advantage of the present invention over the use of prior art preselected framing patterns is that the likelihood of misframe persistence is dependent on the entropy of the "random" pulses rather than on the length of the framing sequence, with all of the consequent savings in time and hardware for reframing.

BRIEF DESCRIPTION OF THE DRAWINGS

In the drawings:

FIG. 1 a general block diagram of a multiplex pulse transmission system illustrating one embodiment of the parity framing techniques of the present invention;

FIG. 2 is a graphical representation of one frame of pulses in a pulse stream generated in FIG. 1 and is useful in explaining the operation of the system of FIG. 1;

DETAILED DESCRIPTION OF THE DRAWINGS

Figure 3:
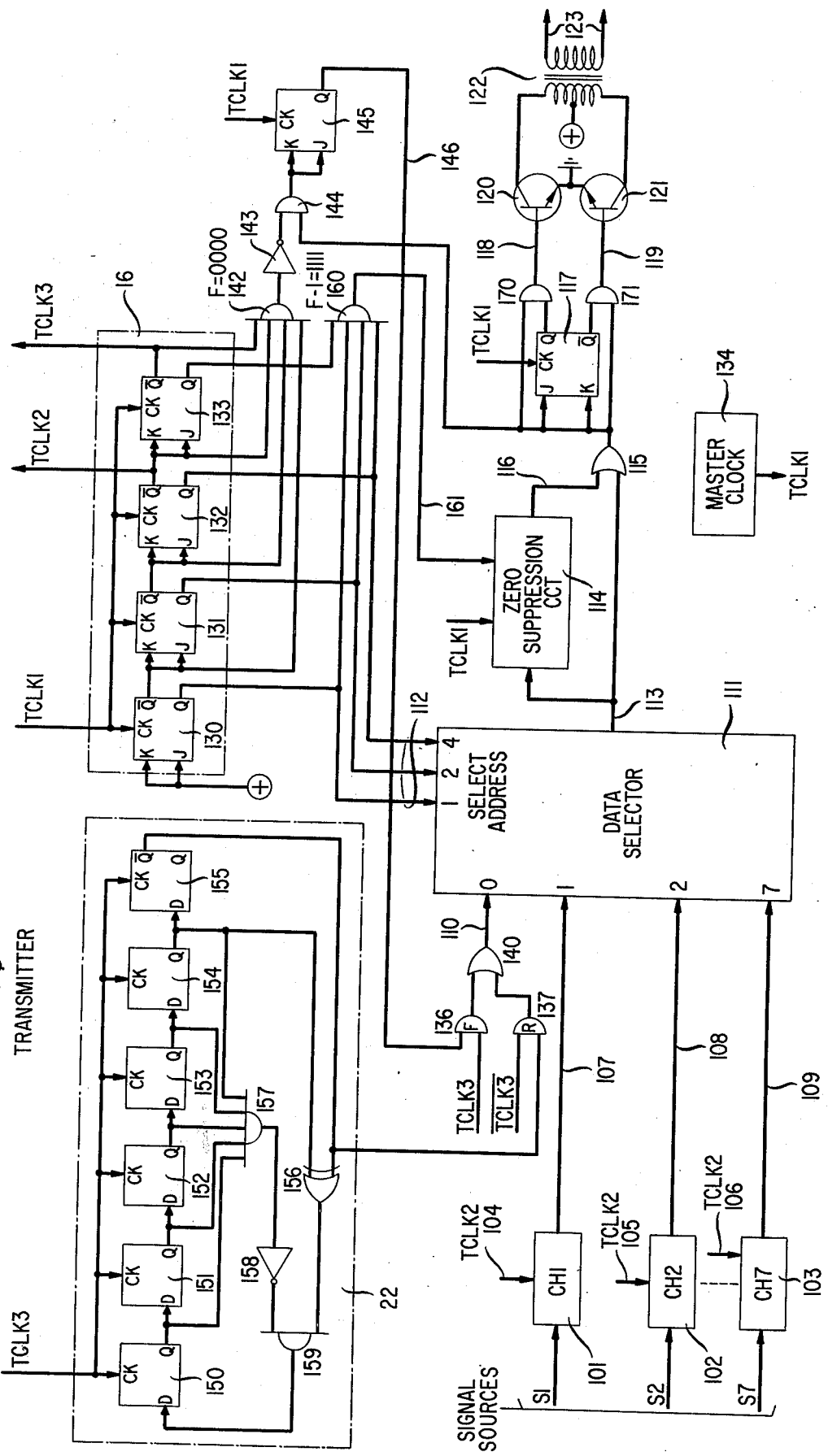
FIG. 3 is a more detailed circuit diagram of the transmitting terminal of the system of FIG. 1.

Referring more particularly to FIG. 1, there is shown a block diagram of an illustrative embodiment of the present invention comprising a transmitting terminal 10 and a receiving terminal 20 for transmitting multiplexed pulse encoded signals from transmitting terminal 10 to receiving terminal 20.

Transmitting terminal 10 comprises a plurality of lines 11 from signal sources (not shown) which may comprise voice signals, video signals, or any other form of analog signals, or may be sources of digital signals. Signal lines 11 are connected to a bank 12 of pulse encoders (for analog signals) or pulse repeater (for digital signals) which translate signals on each of lines 11 into a corresponding stream of binary pulses on output leads 13. The pulse streams on leads 13, framing pulses generated by parity detector 20, and random pulses from random bit generator 22 are combined in parallel-to-serial converter 14 into a single pulse stream on line 15. Converter 14 is under the control of a frame counter 16 which, in turn, is under the control of a clock pulse stream from clock pulse source 17.

In many transmission systems, particularly of the repeatered type, a more or less continuous stream of signal transitions is required to maintain proper regeneration of correct timing. To this end, a zero suppression circuit 18 is supplied which prevents the transmission of any unduly long sequences of zeros in the pulse stream on lead 15. This is accomplished by forcing a one to appear on output lead 19 any time the sequence of ZEROS exceeds some preselected threshold. The pulse stream on lead 19 is supplied to a parity detecting circuit 20 which detects the parity of a frame of pulses on lead 19. It applies the parity signal, by way of lead 21, to serial converter 14 for insertion into the pulse stream. A random bit generator 22 supplies random bits, via lead 21, to converter 14 also for insertion into the pulse stream. Random bit generator 22 may generate any sequence of bits approaching a so-called maximum entropy sequence, e.g., a maximal-length pseudo-random bit generator.

The pulse stream on lead 19 is applied to transmission circuits 23 to prepare them for transmission on transmission medium 24. Transmission medium 24 may comprise a twisted pair of conductors, a coaxial or radio link, or any other transmission medium.

The signals launched or transmission medium 24 are received at a remote terminal 20 by receiving circuits 30. In receiving circuits 30, the transmitted signals are operated upon to restore the original pulse stream on output lead 31. Signals on transmission medium 24 are also applied to a timing regenerator 32 which utilizes the received pulse stream to regenerate a timing wave which is applied to clock generator 33.

The pulse stream on lead 31 is applied to a serial-to-parallel converter 34 which converts the single input pulse stream into a plurality of pulse streams on output leads 35, under the control of a frame counter 36. The pulse streams on leads 35 are decoded by bank 37 of decoders to provide a plurality of analog signals on respective output leads 38.

In order to assure proper framing of the received pulse stream at terminal 20, a misframe detector and reframe circuit 39 is provided. The pulse stream from receiving circuits 30 is applied to parity detector 40, the output of which is supplied to misframe detector and reframe circuit 39. The pulse stream from receiving circuits 30 is also applied to error detecting circuit 41 which, by any known technique, detects errors in the pulse stream and supplies an indication thereof on output lead 42. These error indications are applied to misframe detector 39 to prevent the recognition of a misframe in the frames in which errors have occurred. The output of misframe detector and reframing circuit 39 is applied to frame counter 36 to control the proper framing of the received pulse stream.

The multiplex pulse transmission system of FIG. 1 can be implemented for any number of signal sources and utilization circuits and may have the parity framing and random bits at any positions within a frame. For purposes of illustration, a system for multiplexing seven signals will be assumed with the frame as illustrated in FIG. 2.

In FIG. 2, there is a graphic representation of a single 16-bit frame for a muliplexed pulse transmission system such as that illustrated in FIG. 1. A seven-channel transmission system is assumed in which the channels are numbered 1 through 7. The first pulse position 50 of each frame is reserved for the framing bit which is calculated as will be described hereinafter. The ninth pulse position 51 of each frame is reserved for a "random" bit which is generated as will be described hereinafter. The remaining pulse positions of each frame are divided between two groups called the F group and the R group, due to the presence of the F and R positions, respectively. The framing bit position 50 of each frame is filled by a binary signal representing the modulo-two sum of all the bits in the previous frame. Thus, the value placed in the framing time-slot 52 for the next succeeding frame is the modulo-two sum of the bits in all of the pulse positions in the previous frame, including the framing bit position 50 of that frame. A pseudo-random bit is inserted in pulse position 51 to minimize the probability that any bit other than the framing bit could satisfy a similar relationship to the 16 bits preceding it.

In FIG. 3, there is shown a more detailed circuit diagram of the transmitting terminal 10 of the multiplex transmission system of FIG. 1. Each of seven analog signal lines S1 through S7 are applied to the corresponding one of seven signal encoders 101 through 103. Encoders 101 through 103, under the control of appropriate clock pulses on leads 104 through 106, generate encoded pulse streams on output leads 107 through 109, respectively. A data selector 111, under the control of binary counts on leads 112, successively connects leads 107 through 110 to an output lead 113. The signal on lead 110 is alternately a framing pulse or a "random" pulse generated in the manner to be described hereinafter.

Output lead 113 is applied to zero suppression circuit 114, the output of which is connected to OR gate 115. The output of OR gate 115 comprises the data pulse stream from lead 113 until a one insertion is required;

the output of gate 115 then comprises a one from zero suppression circuit 114 appearing on lead 116. The output of OR gate 115 is applied to the J and K inputs of flip-flop 117, which changes state each time the data is a ONE. In accordance with the state of flip-flop 117, therefore, successive ONE's in the binary output of gate 115 are converted to ONE's appearing alternately on the outputs of gates 170 and 171. A zero on the output of gate 115 is converted to zero's on the outputs of both gates 170 and 171. The outputs of gates 170 and 171 drive transistors 120 and 121, respectively, which in turn drive current through the primary of transformer 122 in opposite directions. The secondary of the transformer drives a balanced line 123. Hence ZERO's on the output of gate 115 are converted to "no pulses" on the balanced line 123, while ONE's on the output of gate 115 are converted to alternating positive and negative pulses on balanced line 123.

The data selector 111 is controlled by a framing counter 16 comprising four J-K flip-flops 130, 131, 132, and 133. Flip-flops 130–133 are driven by TCLK1 clock pulses from master clock generator 134. Flip-flops 130–133 are interconnected as a normal modulo-16 binary counter to provide, on output leads 135, a regular succession of binary pulse patterns corresponding to the successive numbers in the binary counting system. The first three of these output leads comprise leads 112 and are used to drive data selector 111. The fourth stage 133 is used to distinguish the F-group and the R-group of FIG. 2 and to this end are used to alternately enable AND gates 136 and 137. AND gates 136 and 137 are used to pass the framing bit on lead 138 or the random bit on lead 139 through OR gate 140 to input lead 110 to data selector 111. In this way, the frame illustrated in FIG. 2 is generated by data selector 111.

A four-input AND gate 142 detects the all ZERO's condition of counter 16 to provide an indication of the framing time slot. This signal is inverted by inverter 143 and applied as one input to AND gate 144. The other input to AND gate 144 is the serial pulse stream from OR gate 115. The output of AND gate 144 is applied to J-K flip-flop 145 which opertates as a modulo-two summing circuit for the output pulse stream. The output of flip-flop 145 on lead 146 therefore comprises the framing bit and is applied to AND gate 136 for incorporation into the pulse stream in the next frame.

The random bit generator 22 is a so-called maximal length "pseudo-random" pattern generator comprising a shift register including a plurality of flip-flops 150 through 155. The outputs of the last and second-last stages of the shift register are combined in EXCLUSIVE-OR gate 156. The outputs of the first five stages 150 154 of the shift register are combined in AND gate 157 which is inverted by inverters 158 and combined in AND gate 159 with the output of EXCLUSIVE-OR circuit 156, to prevent latching of all flip-flops 150–155 in the "1" state. The output of AND gate 159 is used as an input to the shift register comprising flip-flops 150 through 155. THe output of flip-flop 155 is connected to lead 139 and comprises the random bit stream. The shift register comprising stages 150–155 is advanced by TCLK3 clock pulses which appear once in every frame and thus generate a new random pulse for each new frame.

A four-input AND gate 160 is provided to detect the all-ONE's output from counter 16 and thus provide an indication on lead 161 of the last pulse position in each frame. This signal is used by zero suppression circuit 114 to insure that the one forced by the zero suppression circuit is never entered in the framing slot position. This prevents the zero suppression activity from interfering with framing. The one is instead forced in the last pulse position of the frame before the framing time slot to insure an adequate number of ones in the pulse stream.

The ZERO suppression circuit 114 merely prevents an unduly long sequence of ZERO's from being transmitted from the transmitter of FIG. 3. In its most simplified form, circuit 114 may be merely a counter which counts successive ZERO's and inserts a ONE when the counter overflows. The counter is reset by each appearance of a ONE. Alternatively, the zero suppression circuit may comprise a circuit such as that shown in applicant's U.S. Pat. No. 3,924,080 issued Dec. 21, 1975.

Figure 4A:
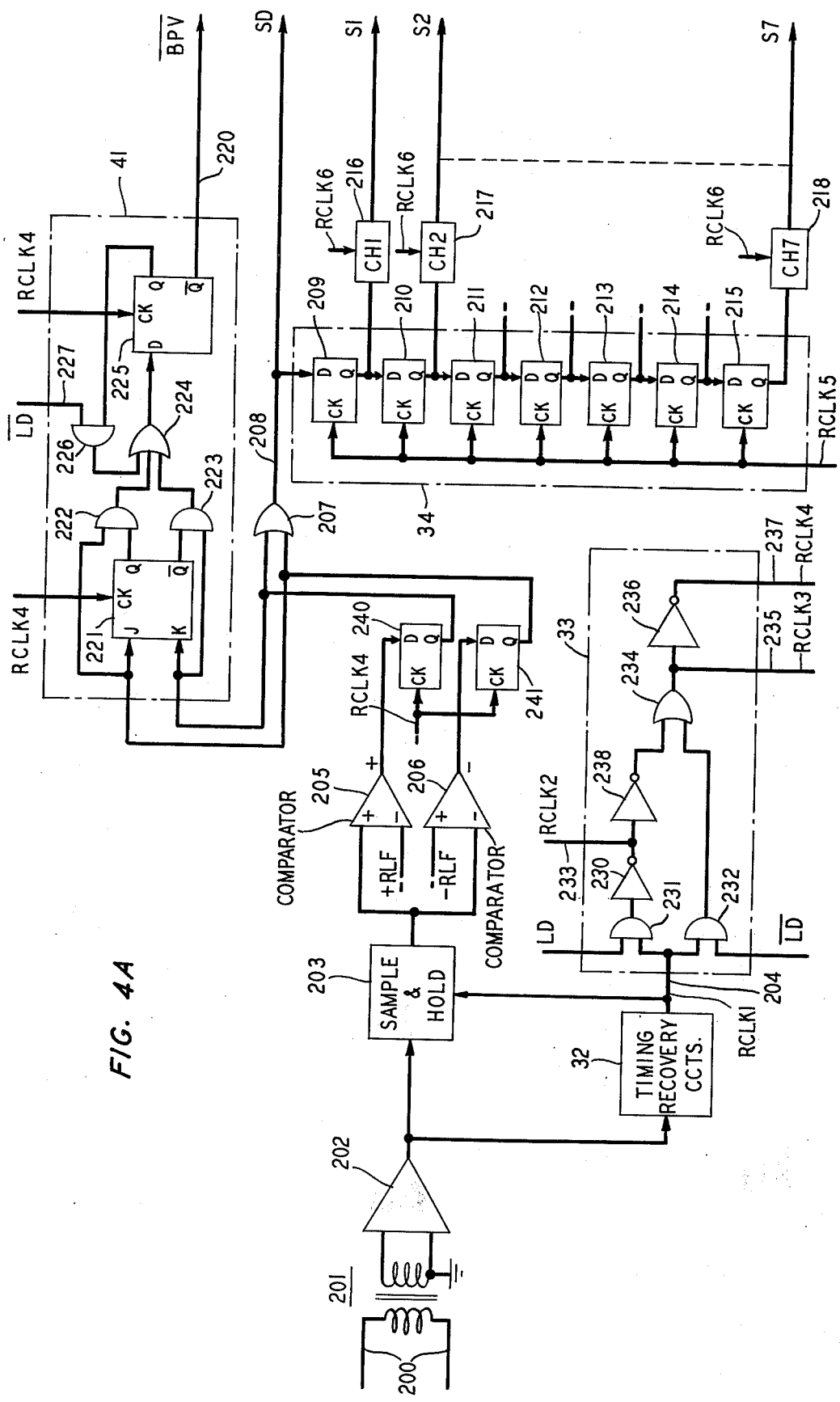
FIGS. 4A and 4B, taken together, are a more detailed circuit diagram of the receiving terminal of the system of FIG. 1.
Figure 4B:
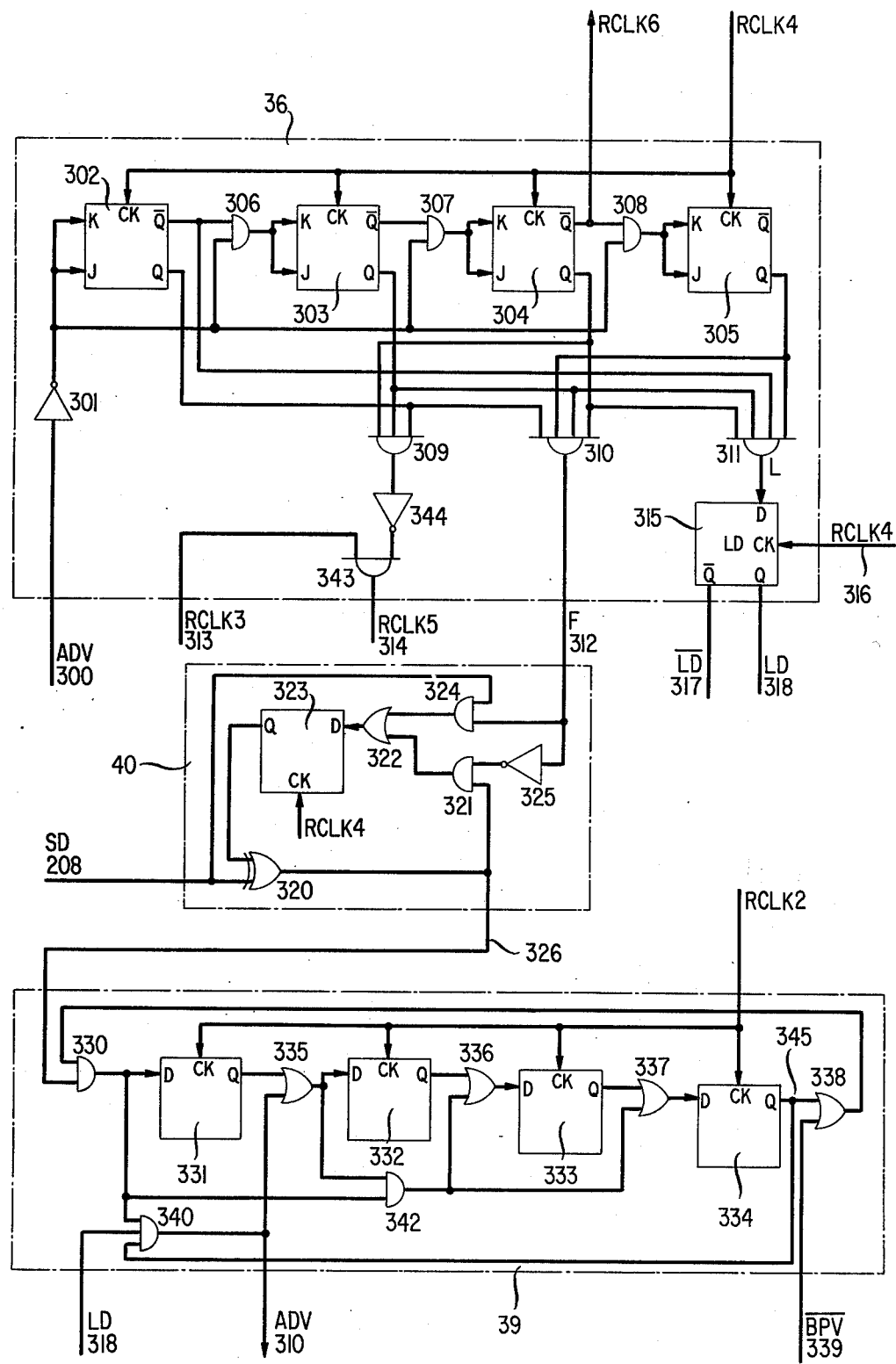

In FIGS. 4A and 4B, there is shown a detailed circuit diagram of receiving circuits suitable for implementing the receiving terminal 60 of FIG. 1. In FIG. 4A, the bipolar signals received on transmission line 200 are applied via transformer 201 to amplifier 202 which may provide some equalization of the signals as well as amplification. The amplified output signals are applied simultaneously to sample-and-hold circuit 203 and to timing recovery circuit 32. Recovery circuit 32 may comprise any slaved clock source known in the art and serves to provide a timing pulse stream on lead 204 in synchronism with the received pulse stream. Sample-and-hold circuit 203, under the control of timing pulses from circuit 32, samples the received pulse stream and holds each sample until the next sampling time. The output of sample-and-hold circuit 203 is connected to comparators 205 and 206. Comparators 205 and 206 may comprise any analog comparison circuits such as, for example, Schmitt trigger circuits.

Comparator 205 compares the received bipolar data signals to a positive reference voltage. Each time the input signal exceeds this reference, a ONE output signal is provided from comparator 205. At all other times, comparator 205 provides a ZERO output signal. At the same time, comparator 206 compares the received bipolar pulse signal to a negative reference voltage. Each time this signal is more negative than this negative reference signal, comparator 206 produces a ONE output signal. At all other times, a ZERO output signal is produced by comparator 206.

The outputs of comparators 205 and 206 are applied to flip-flops 240 and 241, respectively, and then combined in OR gate 207 to provide on lead 208 a serial pulse stream. Together, comparators 205 and 206, flip-flops 240 and 241, and OR gate 207 comprise a ternary-to-binary converter. The binary output stream on lead 208 is applied to a serial-to-parallel converter 34 (FIG. 1) comprising a seven-stage shift register having stages 209 through 215. The output of each of these stages is connected to a respective one of the channel circuits 216 through 218 which, in turn, are connected to output lines S1 through S7. As previously noted in connection with the transmission circuits, the channel circuits 216 through 218 may be digital-to-analog converters, in which case signals on lines S1 through S7 will be analog signals, or the channel units 216 through 218 may merely be digital receiving circuits to pass on the received digital signals.

The outputs of comparators 205 and 206 are also connected to error detection circuit 41 which serves to detect violations of the bipolar encoding rule. That is, circuit 41 detects appearances of successive positive-going or successive negative-going pulses appearing on transmission medium 200. Any other type of error detection circuitry would be equally suitable, the only requirement being that an indication of pulse errors appear on output lead 220 for each error in the received bit stream.

The bipolar violation detector 41 comprises a flip-flop 221 driven by the outputs of flip-flops 240 and 241. When set in either state by such an output, a succeeding input on the same lead fully enables either AND gate 222 or AND gate 223 and thus indicates a bipolar violation. These outputs are combined in OR gate 224 and applied to flip-flop 225. Flip-flop 225 serves to store an indication of bipolar violation for the duration of the current frame. The output of the flip-flop 225 is applied to AND gate 226 along with a timing signal on lead 227 which becomes ZERO only during each framing time slot. The output of the AND gate 226 affords a third input to OR gate 224. Thus flip-flop 225 will be set to ZERO at the end of each framing time slot unless a bipolar violation occurs during that time slot. During any time slot other than the framing time slot, however, the Q output of flip-flop 225 feeds back to the input of OR gate 224 through "enabled" AND gate 226, such that if flip-flop 225 is set during the frame by a bipolar violation, the flip-flop remains set until the end of the next framing time slot, at which time it may be reset as described above. The output on lead 220 is actually an inverted bipolar violation signal and is used, as will be described hereinafter, to inhibit the operation of a misframe detector and thus prevent the misinterpretation of data bit errors as framing errors.

The output of timing recovery circuit 32 is also applied to clock sequence generating circuit 33 at the inputs of two AND gates 231 and 232. The other input to AND gate 231 is a clock signal (LD) occurring once per frame while the second input to gate 232 is the same clock signal inverted. The output of AND gate 231 drives an inverter 230, the output of which appears on lead 233. The clock pulses (RCLK2) on lead 233 advance a reframing circuit, described in connection with FIG. 4B, once per frame. The output of inverter 230 is again inverted by inverter 238.

The outputs of AND gate 232 and inverter 238 are combined in OR gate 234 to provide a clock pulse stream (RCLK3) on lead 235 which is similar to the input clock pulse stream on lead 204 but delayed by a portion of a clock period. This clock pulse stream on lead 235 is used in some portions of the receiving circuit in order to avoid race conditions. This clock pulse stream is inverted by inverter 236 to provide an inverted clock pulse stream (RCLK4) on lead 237 which is used in yet other portions of the receiver circuit.

Figure 5:
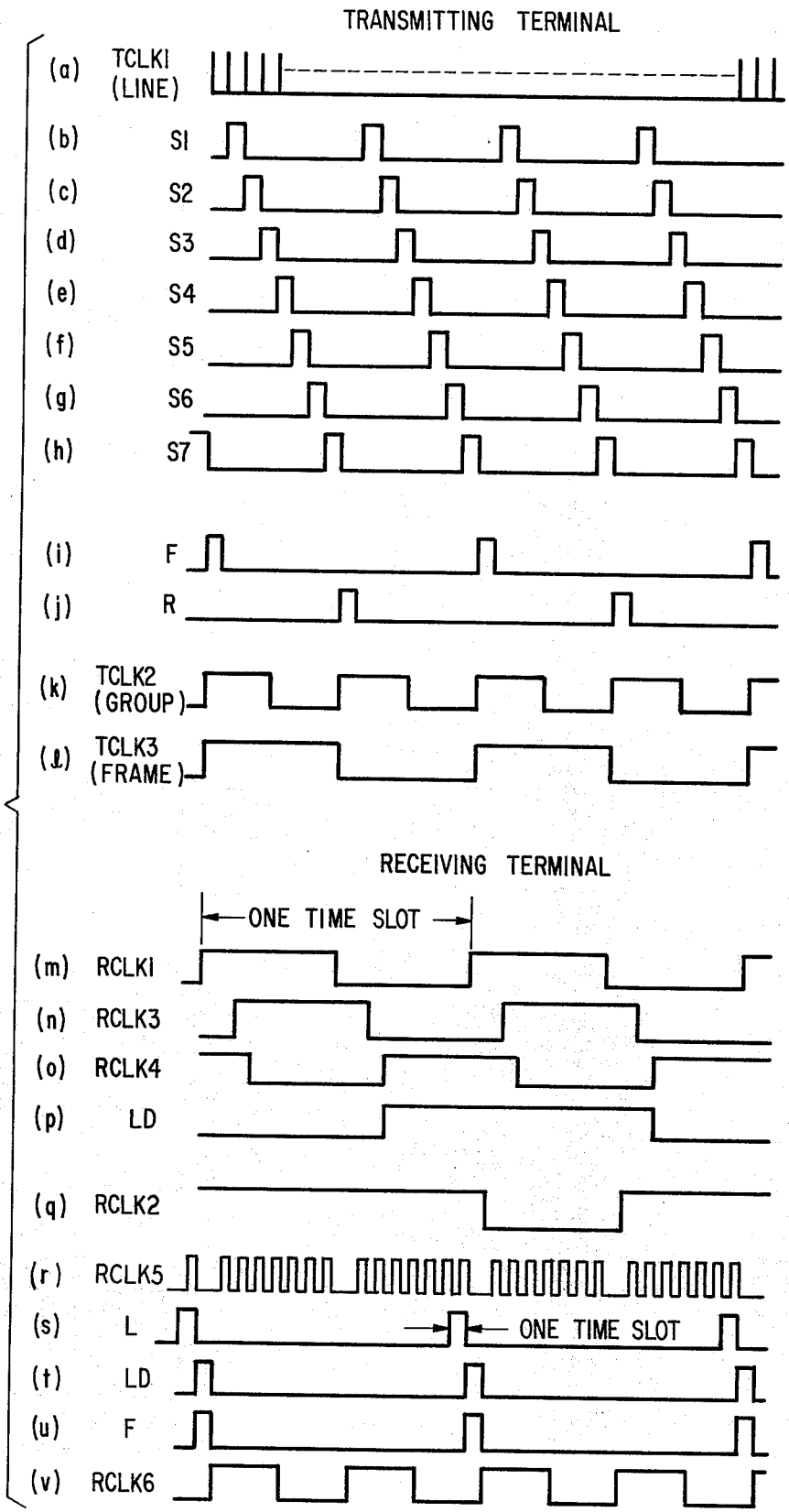
FIG. 5 is a timing diagram useful in explaining the operation of FIGS. 3 and 4.

FIG. 5 illustrates the wave forms of the major timing pulses used in FIGS. 3 and 4. They are labeled to correspond to the indicators in the other figures.

In FIG. 4B, there is shown the remaining portions of the receiving circuits for the multiplex pulse transmission system of FIG. 1. FIG. 4B consists of a framing counter 36, a parity detecting circuit 40, and a misframe detector and reframing circuit 39, all as shown in the block diagram of FIG. 1. The framing counter 36 can be inhibited by a pulse on lead 300 which is applied through inverter circuit 301. The framing counter is driven by RCLK4 clock pulses and comprises four flip-flops 302, 303, 304 and 305 interconnected to operate as a binary counter. Normally enabled AND gates 306, 307 and 308 are interposed between the stages of this counter to permit blocking the advancement of this counter by a pulse on lead 300.

The outputs of the stages 302 through 305 of the frame counter 36 are combined in AND gates 309, 310 and 311 to select specific time-slots in each frame of time-slots. AND gate 310, for example, detects the all "ONE's" condition which, at the receiver, represents the framing time slot. This framing time slot timing signal is supplied on lead 312 and is used, as will be described hereinafter, to control the parity detector 40.

AND gate 309 detects ones from the first three stages of the frame counter 36 and thus selects the time slot corresponding to both the R and F time slots in the frame illustrated in FIG. 2. The output of AND gate 309 is inverted by inverter 344 and clock pulses on lead 313 are combined with these inverted R and F time-slotted pulses in gate 343 to provide on output lead 314 a sequence of clock pulses occurring during all time-slots except the framing and random-bit time slots. As illustrated in FIG. 4A, these pulses are used to advance the serial-to-parallel converter 34 and thus gate the serial data into the shift register prior to conversion.

AND gate 311 detects the "0111" time slot which is the last time slot in each frame. Pulses in this time slot are applied to flip-flop 315 which delay these pulses for one pulse period under the control of RCLK4 clock pulses on lead 316. As described in connection with FIG. 4A, the outputs of flip-flop 315 on leads 317 and 318 are used to control AND gates 231 and 232.

The serial pulse data from lead 208 of FIG. 4A is supplied to parity detector 40 comprising an EXCLUSIVE OR gate 320, the output of which is connected to AND gate 321.

The other input to AND gate 321 is taken from lead 312 after inversion in inverter 325 and comprises a clock signal appearing during the framing time-slot. The output of AND gate 321 is applied through OR gate 322 to flip-flop 323. The output of flip-flop 323 comprises the other input to exclusive OR gate 320.

The serial data is also applied to AND gate 324 the other input of which is the framing pulse from lead 312. The output of AND gate 324 is applied through OR gate 322 to flip-flop 323. In operation, the serial data on lead 208 is entered into flip-flop 323 only at the end of the framing time slot, under control of the frame slot pulse on lead 312. This initializes the modulo-2 sum of the 16 bits of each frame. During the remainder of the frame, AND gate 321 is enabled, such that flip-flop 323 is loaded with the modulo-2 sum of its previous contents and the serial data appearing on lead 208. During each framing time slot, therefore, the parity valve over the preceding frame, and the present framing data, are inputs to exclusive OR gate 320. The output of exclusive OR gate 320 on lead 326 represents the parity of this combined pulse group and thus is a ONE only when the parity is odd, i.e., when there is a parity error.

The parity errors on the lead 326 are applied to misframe detector and reframing circuit 39. Circuit 39 comprises AND gate 330 to which the parity errors are connected and the output of which is applied to a four-stage shift register comprising flip-flops 331, 332, 333 and 334. This register accumulates parity violations so as to determine when a misframe condition exists, and is clocked once per frame by RCLK 2. A ONE appearing on lead 345 at the output of flip-flop 334 indicates the receiver is in an out-of-frame condition. Parity violations are entered into the register from the output of AND gate 330. If the circuit is in an in-frame condition (lead 345 at ZERO), then a parity violation may be entered only if no bipolar violations have occurred during the present framing time slot or the preceding frame, as controlled by the output of OR gate 338 which reflects the stored bipolar violation signal on lead 339. As long as an in-frame condition is being assumed, parity violations entered as described above are shifted through the register in normal fashion, until two successive parity violations are encountered. In that event, AND gate 342 detects a ONE input (representing parity violation) at each of flip-flops 331 and 332, and causes the inputs of flip-flops 333 and 334 to become ONE via the action of OR gates 336 and 337. Thus, all four flip-flops are set when the next clock pulse arrives. Since lead 3435 is now at a ONE level, an out-of-frame condition is now assumed. It now requires four successive frames with no parity violations (regardless of whether bipolar violations occur) to clear the register and return to the assumed in-frame condition. While the out-of-frame condition persists, the outputs of gates 338, 330, 340, 335, 342, 336, and 337 will all be ONE if a ONE appears on lead 317, which occurs during the assumed framing time slot (LD = 1), and a parity violation is indicated at that time. Hence, any parity violation received again sets the four-register flip-flops to a ONE state. The presence of a ONE on the output of gate 340 also inhibits the advance of the framing counter via lead 300. The inhibiting action is limited to one clock interval by the action of flip-flop 315. The effect of inhibiting the counter for one clock interval is to shift by one position the time slot to be tested for framing data. Thus, shifting among the various slots continues until a time slot is encountered for which parity violations are not encountered for four successive frames, at which time the register would be cleared and the in-frame condition assumed. Misframe detection would then again require two successive parity violations.

It will be noted that parity framing requires very simple framing detectors and framing sequence generators. Moreover, the freedom of the framing technique from remaining in an undetected misframe condition is dependent on the probability of a data sequence mimicking the proper framing sequence. Since the parity values are randomized by the pulses from pseudo-random generator 22 (FIG. 1), the likelihood of this sequence being simulated by data rather than calculated parity framing signals approaches the likelihood of that data simulating the pseudo-random sequence itself. This likelihood can be reduced toward a minimum (a minimum assuming unrestricted source data properties) by increasing the entropy of the pseudo-random pulse stream.

In practice, the random generator must be devised such that for each integer N up to a sufficiently large valve, the relative frequencies of occurrence of all possible N-digit sequences in the random data time slot are approximately equal. The maximum N is selected according to source data pecularities and the desired performance level. A random generator may be realized using appropriately long feed back shift registers, for example, or an amplified thermal noise source with a threshold adjusted to provide a 50% probability of ONES and ZEROS.

Since the present system relies upon the contents of an entire frame for misframe detection, it is important to insure this detection against bit errors arising during data transmission. It is therefore important to inhibit misframe detection whenever such bit errors occur.

It would of course be possible to interrupt the data pulse stream when misframing is detected and to substitute a synchronizing pulse stream to insure rapid reframing. Such a system would have the advantage of not requiring a trial and error reframing procedure but instead would permit immediate reframing by the synchronizing sequence.

What is claimed is:

1. A multiplex pulse transmission terminal comprising:
    means for interleaving a plurality of pulse streams into a single pulse stream,
    means for dividing said single pulse stream into successive frames of pulses including preselected sequences of pulses from said plurality of pulse streams,
    means for inserting a randomly-valued pulse derived independently of said pulse streams into each said frame of pulses,
    means for ascertaining the parity of each said frame of pulses, and
    means for inserting a parity pulse in each said frame of pulses.

2. A multiplex pulse receiving terminal comprising:
    means for receiving a single pulse stream including pulse positions dividing said single pulse stream into successive frames of pulses,
    means for ascertaining the parity of groups of successive pulses in said single pulse stream, each of said groups including one of said frames and the final pulse of the next previous frame,
    means for detecting a bit position providing a preselected parity over said group of successive pulses, and
    means, responsive to said detecting means, for separating said single pulse stream into a plurality of separate pulse streams.

3. A pulse framing circuit comprising:
    a source of a stream of information-bearing pulses having regularly recurring pulse position dependent properties,
    means for subdividing said stream into repetitive groups of pulse positions,
    means for inserting a randomly-valued pulse derived independently of said information-bearing pulses into each said group of pulse positions, and
    means for adding a parity bit to each said group of pulse positions.

4. The pulse framing circuit according to claim 3 wherein said pulse stream comprises frames of multiplexed pulses from different pulse sources.

5. The pulse framing circuit according to claim 3 wherein the value of said parity bit is determined by the parity bit of the previous group of pulse positions as well as by the group of pulse positions to which it is added.

6. A frame detection circuit comprising a source of a stream of information-bearing pulses including pulse positions dividing said stream into successive frames of pulse positions,
    means for parity-checking groups of pulse positions of said stream, said groups each including one of said frames and at least one preceding pulse position, means, responsive to said parity-checking means, for framing said successive groups of pulse positions, and means, responsive to said framing means, for demultiplexing said pulse stream.

7. The frame detection circuit according to claim 6 wherein said pulse stream comprises frames of multiplexed pulses from different pulse sources.

8. The frame detection circuit according to claim 6 further comprising:

a misframe detecting means, responsive to said parity-checking means, for detecting a preselected pattern of incorrectly framed groups of pulse positions, and means responsive to said misframe detecting means for reframing said groups of successive pulse positions.

9. The frame detection circuit according to claim 8 further comprising:

an error detection circuit for detecting errors in said pulse stream, and means responsive to said error detecting circuit for disabling said misframe detection means.

10. A multiplex pulse transmission system comprising:

means for adding parity bits to successive multiplex frames in said system, means for adding independently derived random bits to said successive multiplex frames in said system, and means, utilizing said parity bits, for detecting misframing in said system.

11. The method of maintaining correct framing of a multiplex pulse transmission system comprising the steps of:

1. inserting an independently derived randomly-valued pulse in each frame of pulse positions in said system;
2. inserting a framing pulse in each said frame having a value dependent on the parity of the preceding frame of pulse positions in said system;
3. detecting the parity of each frame of pulse positions in said system; and
4. determining the proper framing of said pulse positions by comparing said parity to pulse value in any prospective framing pulse position.

12. The method of maintaining correct framing according to claim 11 further including the steps of:

5. detecting improperly framed groups of pulse positions; and
6. reframing said pulse positions in response to a plurality of misframed groups of pulse positions.

13. The method of maintaining correct framing according to claim 12 further including the steps of:

7. detecting transmission errors occurring in said system; and
8. inhibiting step (5) whenever a transmission error occurs.

* * * * *